US008626719B2

(12) United States Patent
Shaw

(10) Patent No.: US 8,626,719 B2
(45) Date of Patent: Jan. 7, 2014

(54) METHODS OF MANAGING AND ACCESSING E-MAIL

(75) Inventor: Timothy C. Shaw, Amherst, NH (US)

(73) Assignee: EMC Corporation, Hopkinton, MA (US)

( * ) Notice: Subject to any disclaimer, the term of this patent is extended or adjusted under 35 U.S.C. 154(b) by 261 days.

(21) Appl. No.: 10/985,389

(22) Filed: Nov. 11, 2004

(65) Prior Publication Data

US 2006/0101099 A1    May 11, 2006

(51) Int. Cl.
*G06F 7/00* (2006.01)

(52) U.S. Cl.
USPC .......................................... 707/673; 709/206

(58) Field of Classification Search
USPC .......................................... 707/2, 1, 200, 673
See application file for complete search history.

(56) References Cited

U.S. PATENT DOCUMENTS

| | | | |
|---|---|---|---|
| 6,144,959 A * | 11/2000 | Anderson et al. .................. 707/9 |
| 7,054,905 B1 * | 5/2006 | Hanna et al. .................. 709/206 |
| 7,113,948 B2 * | 9/2006 | Jhingan et al. .................. 707/10 |
| 7,257,639 B1 * | 8/2007 | Li et al. .......................... 709/232 |
| 2001/0051991 A1 * | 12/2001 | Beyda et al. .................... 709/206 |
| 2001/0054073 A1 * | 12/2001 | Ruppert et al. ................. 709/206 |
| 2002/0056123 A1 * | 5/2002 | Liwerant et al. ................ 725/87 |
| 2002/0138586 A1 * | 9/2002 | Paleiov et al. ................. 709/207 |
| 2004/0133644 A1 * | 7/2004 | Warren et al. .................. 709/206 |
| 2004/0158607 A1 * | 8/2004 | Coppinger et al. ........... 709/206 |
| 2005/0060375 A1 * | 3/2005 | Ernest et al. ................... 709/206 |
| 2005/0080889 A1 * | 4/2005 | Malik et al. .................... 709/223 |
| 2005/0108335 A1 * | 5/2005 | Naick et al. .................... 709/206 |
| 2005/0188026 A1 * | 8/2005 | Hilbert et al. .................. 709/206 |
| 2005/0193145 A1 * | 9/2005 | Brown et al. .................. 709/238 |
| 2006/0018270 A1 * | 1/2006 | Forand et al. .................. 370/324 |
| 2006/0031309 A1 * | 2/2006 | Luoffo et al. .................. 709/206 |
| 2006/0085503 A1 * | 4/2006 | Stoye et al. .................... 709/206 |
| 2006/0171523 A1 * | 8/2006 | Greenwell ..................... 379/242 |

OTHER PUBLICATIONS

EmailXtender for Lotus Notes—The complete Email Management Solution; http://www.legato.com/products/emaixtender/lotus.cfm?mode=features, Download Date: Aug. 9, 2004, pp. 1-2.

(Continued)

*Primary Examiner* — Amy Ng
(74) *Attorney, Agent, or Firm* — Dergosits & Noah LLP; Todd A. Noah

(57) ABSTRACT

Methods and systems for managing e-mails involve an e-mail server that maintains a data set identifying e-mails, and that implements a shortcut feature whereby at least a portion of an e-mail identified in the data set is identified by a shortcut identifier, so that the at least a portion of the e-mail is not stored in the data set. One method involves replicating a copy of at least some of the e-mails onto the client computer when the client computer is coupled to the e-mail server. Another method involves accessing a full copy of an e-mail while a client computer is not in communication with the e-mail server. Another method involves maintaining the shortcut identifier for an e-mail in the data set so that the data set is not updated with a full copy of the e-mail when a user requests the e-mail.

26 Claims, 4 Drawing Sheets

(56) References Cited

OTHER PUBLICATIONS

Legato—Email Management Solutions; http://www.legato.com/products/emailxtender; Download Date: Aug. 9, 2004, pp. 1-2.

EmailXtender for Lotus Notes—The Complete Email Management Solution: http://www.legato.com/products/emailxtender/lotus.cfm; Download Date: Aug. 9, 2004; pp. 1.

EmailXtender for Lotus Notes—The Complete Email Management Solution: http://www.legato.com/products/emailxtender/lotus.cfm; Download Date: Aug. 9, 2004, pp. 1.

IBM Lotus Domino, http://www.louts.com/products/product4.nsf/wdocs/dominohomepage; Download Date: Aug. 9, 2004, pp. 1-3.

Lotus Domino Document Manager: http://www-306.ibm.com/software/lotus/knowledge/4523FB65A93D640185256E4D00425 . . . ; Download Date Aug. 9, 2004, pp. 1.

* cited by examiner

METHODS OF MANAGING AND ACCESSING E-MAIL

FIELD OF INVENTION

The present invention relates to management and control of electronic data files

BACKGROUND

E-mail messages often include attachments, such as files. Attached files can have any of a variety of file formats suitable for delivery of, for example, text, audio, images, video, etc. A recipient of an e-mail that includes an attachment initiates actions to open the e-mail and to open the attachment to the e-mail. Opening the attachment often entails retrieving the attachment from an e-mail server or storage device. The recipient can then open the attachment, using, for example, a software program associated with the format of the retrieved file (e.g., using a word processing program to open a word processing file, using a spreadsheet program to open a spreadsheet file, etc.) Aspects of the present invention relate to managing e-mails in a computer system.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
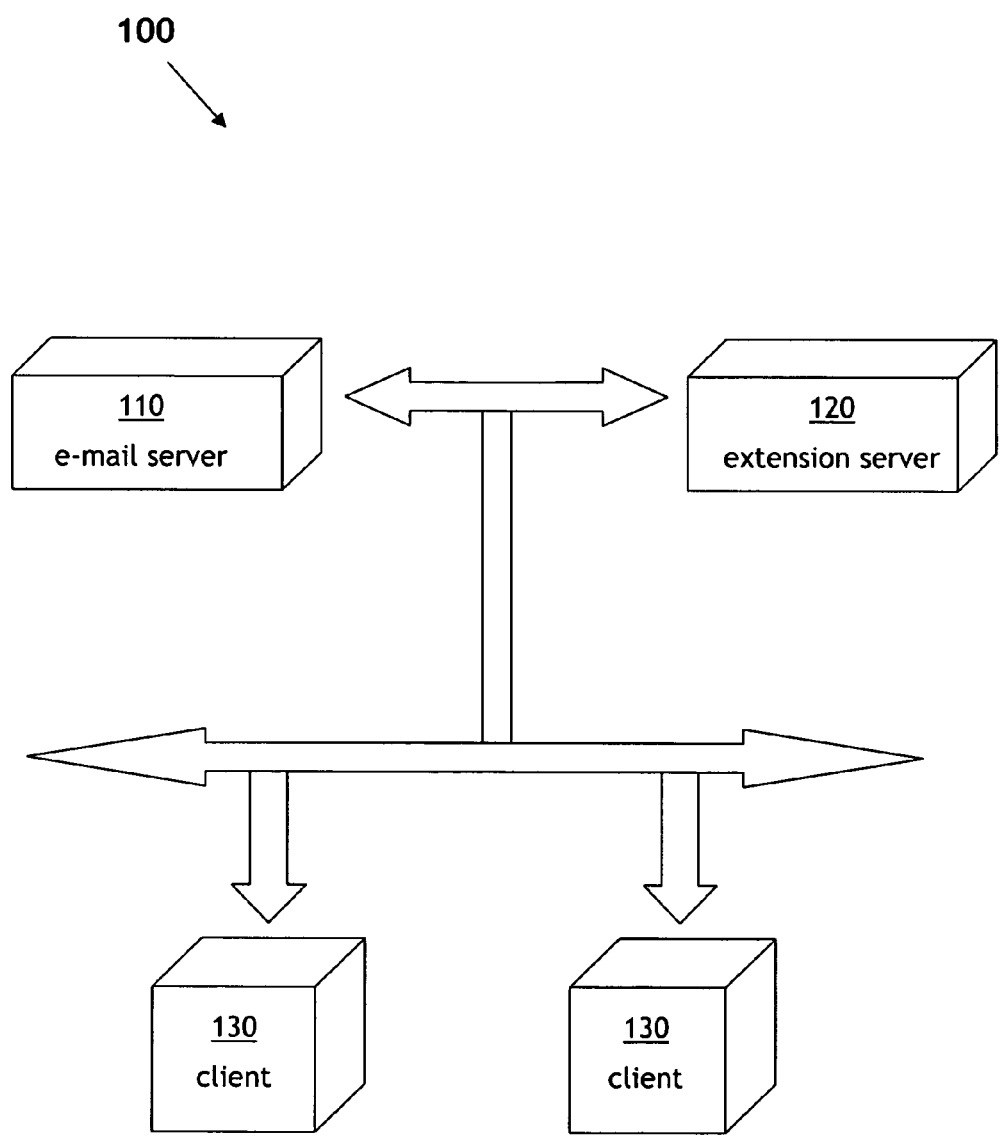
FIG. 1 is a block diagram of a system that manages e-mails, in accordance with one embodiment of the invention.

Some e-mail systems can embed an attachment in an e-mail message in the form of a link to a file stored—possibly in a compressed form—on an e-mail server. When a recipient of the e-mail retrieves the attachment, the e-mail system can deliver the attached file to the recipient, and the recipient can then utilize a local program appropriate to the format of the file to access the file. A local program can also be used to decompress a file stored in compressed form.

To save storage space on the e-mail server, some e-mail systems store attachments remotely, and store a shortcut identifier at the e-mail server. For example, some e-mail systems replace an e-mail attachment with a link related to a Uniform Resource Locator (URL), i.e., a Web address of a network site containing the full attachment. A recipient of the e-mail can then select the link to retrieve the attachment from the indicated Web site.

An example of one such a system places a link to an attachment in an e-mail message forwarded to a client computer, with the formatted full attachment residing in the e-mail server. After retrieving the formatted attachment from the server, the client computer can utilize software located on the client computer to convert the file to a form observable by a user of the client computer. One example of a file format suitable for storage and transmission is the zip compressed format. This format is supported by, for example, PKZIP software (available from PKWare, Incorporated, Brown Deer, Wis.), which can process files having the .zip extension. When activated, the decompression software can decompress a compressed attachment delivered to a client computer.

The above-described systems can require extra effort on the part of a user of the e-mail system to access an attachment, above and beyond the effort in accessing the e-mail that includes the attachment. For example, when a user attempts to access the attachment, the client computer may not recognize the format of the attachment. The user may then need to select a program that recognizes the format to access the attachment.

For example, if the attachment is a compressed file, the user may need to determine what program compressed the file, and then instruct the client computer to utilize that program to decompress the compressed attachment file. If the program is not available on the client computer, the user may need to take additional action to obtain a copy of the program to decompress the attachment.

Moreover, access to attachments can be interrupted when a client computer is disconnected from a network that facilitates the e-mail system.

In accordance with one embodiment of the invention described below, full attachments are stored on a client computer even for e-mails stored using a shortcut ID on the e-mail server. As a result, a user can access the full attachment even when not connected to a network that allows the attachment to be obtained from an e-mail server or via a URL link.

In another embodiment, the e-mail server need not replicate a full copy of an e-mail having a portion thereof represented by a shortcut ID when a full copy is delivered to a client computer. Thus, the advantages of the shortcut ID (e.g., storage savings) can be maintained on the e-mail server, even when a full copy is provided to a requesting client computer.

Accordingly, in one example embodiment, as described in more detail below with reference to FIG. 2, a method of managing e-mails relates to a computer system that includes an e-mail server(s) and a client computer(s). The e-mail server maintains a data set identifying e-mails managed by the e-mail server, and implements a shortcut feature whereby at least a portion of at least one e-mail identified in the data set is identified in the data set by a shortcut identifier. In this manner, the portion of the e-mail is not stored in the data set, and is stored remotely from the data set.

The method includes replicating a copy of at least some of the e-mails identified in the data set on a client computer when the client computer is coupled to the e-mail server. The copy replicated on the client computer may include a full copy of the portion of the e-mail that is identified in the data set by the shortcut identifier. Thus, full copies of e-mails may be stored on the client computer rather than shortcuts that only identify the e-mails, thereby ensuring access via the client computer to the full e-mails even when the client computer is not coupled to the e-mail server.

In another embodiment, as described in more detail below with reference to FIG. 3, a method of managing e-mails includes accessing, by a user of a client computer, a full copy of an e-mail from the client computer while the client computer is not in communication with an e-mail server. The full copy of the attachment can, for example, be stored on the client computer.

In still another embodiment, as described in more detail below with reference to FIG. 4, a method of managing e-mails includes, in response to a request from a user of a client computer to access an e-mail, maintaining a shortcut identifier for the e-mail in a data set managed by an e-mail server so that the data set is not updated with a full copy of the e-mail. Thus, an e-mail server need not replicate a full copy of an e-mail when the e-mail is requested by a user.

The above-described embodiments can be implemented in any suitable manner, as the present invention is not limited in this respect. For example, an e-mail server software platform can be modified to provide full copies of e-mail files to a client computer without any additional effort on the part of the client computer to retrieve and/or access the full copy. The full copies can be delivered to the client computer from any suitable location. In one embodiment, the full copies can be provided directly from an extension server that supports the e-mail server software platform and stores the full copy.

FIG. 1 is a block diagram of an illustrative computer system 100 on which aspects of the present invention described herein can be implemented. The computer system 100 includes an e-mail server(s) 110, a mail extension server(s) 120, and a client computer(s) 130. The extension server 120 can provide remote storage of e-mails, or portions thereof (e.g., attachments), working in cooperation with the e-mail server 120.

The e-mail server 110 can implement an e-mail server application program. The e-mail server 110 can be, for example, a server running any suitable e-mail server messaging software platform. The e-mail server 110 can support, for example, an application such as the LOTUS DOMINO messaging server software platform (from IBM Corporation, Armonk, N.Y.), the EXCHANGE messaging server software platform (from Microsoft Corporation, Redmond, Wash.), or any other messaging server software platform.

The client(s) 130 can execute client software compatible with the messaging server software platform executing on the e-mail server 110. For example, the system 100 can include the LOTUS NOTES client software running on the client computer 130, and working in cooperation with the LOTUS DOMINO messaging server software platform, the OFFICE OUTLOOK client software (from Microsoft Corporation, Redmond, Wash.) working in cooperation with the EXCHANGE messaging server software, or any other suitable client software.

These examples are not intended to limit application of embodiments to any particular messaging platform. For example, embodiments can be applied to other software platforms, such as the Sendmail e-mail software utility (a free shareware program) running under the UNIX operating system (versions available from IBM Corporation, Armonk, N.Y., and other vendors), or other platforms.

In one embodiment, the client computer 130 does not include any software specifically added to the client computer 130 to permit the client computer 130 to be supported by the extension server 120. For example, the client computer 130 can be loaded with any standard DOMINO-related or NOTES-related application program interfaces (APIs), which will function properly when accessing a filed stored by the extension server 120. Thus, the interaction between the extension server 120 and the e-mail server 110 can be performed in a manner that is transparent to the client. However, it should be appreciated that the aspects of the present invention described herein are not limited in this respect, and can be used in connection with systems wherein the client is aware of the existence of the extension server 120, and/or the client 130 has software loaded thereon to communicate (directly or indirectly through the e-mail server 110) with the extension server 120.

Aspects of the present invention can also be implemented on a system wherein additional document control-related software is implemented on the e-mail server 110. For example, the EMAILEXTENDER software product (from EMC Corporation, Hopkinton, Mass.) for managing data storage and content management for electronic messaging can be included in the system 100 and loaded on the e-mail server 110.

In one embodiment described below, document control-related software product is provided with functionality to implement features of the invention. In the example described below, the document control-related software product is the EMAILEXTENDER software product and the e-mail server platform is the DOMINO server software platform. However, this example is merely illustrative, and is not intended to limit the implementation of this embodiment to any particular software platform environment or document control-related software product. In addition, while the functionality performed in accordance with the embodiments of the invention described herein is implemented in a document-control-related software product in accordance with one embodiment of the invention, the invention is not limited in this respect and can be implemented via any software product executing on any computer(s) in the system (e.g., the e-mail server 110, the extension server 120, the client 130, or any other computer.)

In one illustrative embodiment, the e-mail server 110 maintains a data set identifying e-mails that it manages. The e-mail server 110 implements a shortcut feature whereby at least a portion, (e.g., an attachment) of at least one e-mail identified in the data set is identified in the data set by a shortcut identifier, and is stored remotely from the data set by the extension server 120 (i.e., the identified portion is not stored in the data set.) The EMAILEXTENDER software product may provide the shortcut feature, and may create the data set which includes shortcut identifiers.

In one illustrative embodiment, the client computer 130 does not require any software added specifically to implement any features of the present invention. Thus, client computers 130 can benefit from these features without requiring any modification of the software environment running on the client computer 130.

As mentioned above, the e-mail server 110 may maintain a data set identifying e-mails managed by the e-mail server 110, and implement a shortcut feature that involves shortcut identifiers that are included in the data set and identify portions of (or total) e-mails. Thus, a full copy of an e-mail need not be stored by the e-mail server 110 as at least a portion (e.g., an attachment) of an e-mail may be stored by the extension server 120.

The e-mail server 110 can implement the shortcut feature in any suitable manner. For example, the e-mail server 110 can store a redirection document (such as an indicator of the shortcut identifier, or a copy of the shortcut identifier itself) in the data set that it maintains for e-mails that it manages. The e-mail or portion thereof, associated with the redirection document, can then, for example, be stored by the extension server 120. The redirection document may contain meta data indicating the stored file's actual storage location. The redirection document may include enough information to allow it to display properly in, for example, DOMINO platform-related views and folders as if the redirection document were the original file, with the only indication to a user of the client computer 130 that the document is not the original being the small size of the redirection document.

In one embodiment discussed further below, shortcut identifiers are not provided to the client computer, such that the shortcut ID need not be provided in a form that enables the shortcut to be displayed.

As discussed above, in one embodiment, copies of the shortcutted portions such as full copies (including full attachments) are stored on the client computer 130 automatically (i.e., without the shortcut being accessed by the user on the client computer.) This can be accomplished in any suitable way, as the invention is not limited to any particular implementation technique. For example, full copies can be sent from the e-mail server 110, or from the extension server 120, to the client computer 130 on a predetermined schedule. Alternatively, any e-mail having a redirection document that is being sent to the client computer 130 can be trapped, and the redirection document can be replaced with a full copy of the associated portion of the e-mail (e.g., an attachment) for storage on the client computer 130.

As mentioned above, in accordance with one embodiment, when a full copy of an e-mail having a shortcut ID is sent to a client computer, a full copy is not provided to the data set maintained by the e-mail server 110 to save storage space thereon. While this aspect of the present embodiment advantageously can be used in conjunction with the embodiment in which full copies of e-mails including shortcut IDS are provided to the client computer automatically, this aspect of the present invention is not limited in this respect.

Thus, the aspect of the present invention that relates to not updating the e-mail server 110 data set with a full copy of an e-mail portion identified by a shortcut ID can alternatively be employed on a system wherein e-mails having shortcut IDs are sent to the client computer. In such a system when a user of the client computer 130, or an application running on the client computer, selects a redirection document to open the associated e-mail, the actual e-mail is retrieved from the extension server 120 and used to replace the redirection document on the client computer 130. However, unlike convention systems, the accessed e-mail is provided without replacing the redirection document in the e-mail server 110 to conserve storage space thereon.

As mentioned above, the features of the present invention can be implemented in any manner, but in one embodiment are implemented by adding software-related components to document control-related software (such as the EMAILEXTENDER software product) utilized by the system 100. In the illustrative implementation described, shortcut identifiers can be used for entire e-mails (not simply attachments thereto), and the EMAILEXTENDER software product can interface with (or hook into) the e-mail server to control the management of e-mails with shortcut identifiers. When adopted for use with a system that employs the DOMINO message server platform, the components may include a dynamic link library (DLL) that is added to the DOMINO e-mail server 110 executable directory. A database having a ".nsf" extension may be created on the DOMINO-based e-mail server 110 to support the shortcut feature (i.e., the DOMINO software utilizes the Notes Storage Facility file format, designated by the .nsf extension.) The access control level (ACL) of the database may provide "Manager" level access with full rights to a user identification related to a user of the client computer 130, as will be understood by one having familiarity with the DOMINO and EMAILEXTENDER software platforms.

As described in more detail below, the added DLL may reconfigure the e-mail server 110 to trap function calls traveling between the client computer 130 and the e-mail server 110. In one embodiment, the added DLL supports automatic replication of full e-mail files on the client computer 130 and the prevention of such replication on the e-mail server 110. However, as discussed above, in other embodiments these two functionalities can be provided separately, such that other embodiments support either of these functionalities without the other.

In response to a user of the client computer 130 selecting an e-mail message to read, when the client computer is running in a mode with access to the e-mail server, NOTES software running on the client computer 130 transmits various function calls to the DOMINO-based e-mail server 110 to access the user's e-mail. From the perspective of the client computer 130, the DOMINO-based server 110 can appear to fully manage a user's e-mail account. Thus, in one embodiment, the user as well as the client computer 130 need have no awareness of the added software components that implement the features of the present invention. However, it should be appreciated that the invention is not limited to operating in a transparent manner.

For example, when a user selects an e-mail message, a series of function calls, related to the particular request, may be transmitted between the DOMINO-based e-mail server 110 and the NOTES-based client computer 130. For example, a "NSFDbOpen( )" function call may be transmitted from the client computer 130 to initiate access to a user's e-mail message by opening the data set. In the present example, the data set is associated with the user's .nsf database. This function call is, however, trapped through action of the added DLL, described above, to alter the response seen at the client computer 130 from the response that would otherwise be provided by the DOMINO software platform running on the e-mail server 110.

As described in more detail below, flags associated with the NSFDbOpen( ) function call are examined to determine a source of the function call, because NSFDbOpen( ) function calls may be generated by sources other than a user request to access an e-mail, and embodiments of the invention may act differently depending on the source of the function call.

When a client has initiated a request to read an e-mail message, a NSFNoteOpen( ) function call is generated by the client computer 130 to the DOMINO-based e-mail server 110. The DOMINO-based e-mail server 110 may process the function call in its ordinary manner, and retrieve the shortcut identifier for the e-mail from its data set. However, the shortcut identifier will not be returned to the client computer 130, but will instead be trapped by the DLL. The DLL examines metadata in the shortcut identifier to retrieve the full e-mail from its storage location, which can be in any suitable location, including locations outside of the e-mail server data set. The e-mail message, is then delivered to the client computer 130 for review by a user. In accordance with one embodiment discussed above, while the full e-mail is returned to the circuit computer 130, the data set for the e-mail server 110 is not updated and continues to identify the e-mail via the shortcut identifier.

If the e-mail message has an attachment, and the user selects the attachment for review, the client computer generates a NSFDbReadObject( ) function call to read the attachment. This function call, too, may be trapped by the DLL, which can then retrieve the full attachment and return it to the client computer 130 for review by the user in much the same manner as discussed above for the body of the e-mail. For example, the e-mail attachment may be stored by the EMAILEXTENDER software outside of the data set managed by the e-mail server. In addition, in one embodiment, while the full attachment is provided to the client computer, the e-mail server 110 data set is not updated with the full attachment.

The aspects of the present invention described above can be implemented in any of numerous ways, as the present invention is not limited to any particular implementation technique. In one embodiment, the added software components, create a transient storage area, such as a transient area in a database managed by the e-mail server 110 to store the e-mail server data set discussed above. The transient area of the e-mail server database is used to provide an area where an e-mail (or attachment thereof) represented in the non-transient area of the database by a shortcut identifier can be placed temporarily on the e-mail server for transmission to the client computer, without needing to update the non-transient area of the database, in accordance with the embodiment of the invention wherein the e-mail server data set is not updated when an e-mail (or attachment thereof) is accessed by the client computer.

When a function call related to a request for an e-mail is trapped, the software (e.g., the DLL) components can retrieve the full e-mail (or attachment) from the extension server 120, and temporarily store the retrieved full e-mail in the transient (or attachment) database.

In accordance with one embodiment of the present invention, when a user selects an e-mail, or attachment thereof, represented in the e-mail server 110 database, the added software components (e.g., the DLL) described above can find the full e-mail or attachment, and place it into the transient database as discussed above. The added software can then return an identifier for a new "note" in the DOMINO software platform, with the identifier content provided in the transient database. This can be performed by the EMAILEXTENDER software platform, with some modifications made thereto to allow for the interaction with the transient area in the database. The added software components (e.g., the DLL) can then open the note, and copy it into the e-mail or attachment represented by the shortcut identifier, which had already been opened by the DOMINO software platform. Thereafter, the added software components (e.g., the DLL) can trigger the DOMINO software platform to return the full message to the user. In accordance with one embodiment of the present invention, if the returned e-mail does not have an attachment, it can be deleted from the transient database in conjunction with the full message being returned to the client computer.

In accordance with one embodiment of the present invention, e-mails having attachments are handled in a different manner, in that such e-mails are not deleted from the transient database upon being returned to the client computer. Specifically, the possibility exists that the user may want to open the attachment. Thus, the e-mail, along with the full attachment, is maintained in the transient database until it is determined that the user has completed accessing that e-mail. In accordance with one embodiment of the present invention, this determination is made when a NSFNoteClose( ) function call is received for the e-mail.

In accordance with one embodiment of the present invention, the added software components (e.g., DLL) maintain a list of open e-mails stored in the transient database, along with any associated attachments. Thus, when a user opens an attachment, the list is examined, and, when a match is found, the full attachment is returned from the database to the client computer. In accordance with one embodiment, this can be done by trapping the appropriate NSFDbReadObject( ) function call from the client computer, and responding directly to it with the full attachment from the transient database, such that the DOMINO-based e-mail server 110 need not even see the function call.

For e-mails that have attachments, the e-mails and the corresponding attachments are maintained in the transient database until the user finishes examining the e-mail, which can be determined by looking for a NSFNoteClose( ) function call relating to the appropriate e-mail or note, at which point the e-mail and its associated attachments can be edited from the transient database.

With a embodiment of the present invention that works with the DOMINO software platform, it should be appreciated that the database managed by the DOMINO-based e-mail server 110 has a number of mail boxes or accounts set up for each user, such that each user has essentially a separate database. In accordance with one embodiment of the present invention, the added software components (e.g., the DLL) execute as a parasite software component on the DOMINO server and can enjoy supervisory access privileges, so that any portion of the database managed by the DOMINO-based e-mail server 110 can be used to implement the transient database. In accordance with one embodiment of the present invention, security techniques are employed to ensure that the transient database is accessible only to the DOMINO server and the EMAILEXTENDER software platform, and is inaccessible to individual users, to ensure that the e-mails and/or attachments for one user are not visible to another.

It should be appreciated that in a DOMINO software platform (or other e-mail management platforms), e-mails may be accessed by various agents or infrastructure components of the e-mail management platform, as opposed to access by a user. As an example, the e-mail server platform may have a compaction agent running that is designed to compact the amount of storage space used by the e-mail server and/or may have a replication agent executing that seeks to replicate some of the content managed by the e-mail management platform.

In accordance with one embodiment of the present invention, it is desirable to ensure that the above-described actions of returning a full e-mail or attachment thereof, in response to an access to the e-mail or attachment, is only performed when the access originates from a user, and not when the access originates from an agent or infrastructure component of the e-mail management platform. In accordance with one embodiment of the present invention for use with the DOMINO software platform, publicly available flags that are currently unused can be employed to designate the source of the access request, and to ensure that both of the described actions of replacing the shortcut identifier with a full e-mail or attachment are only performed when the source of the access request is a user.

Any suitable flags can be used, or any other suitable technique for designating the source of the access request can be employed, as this aspect of the present invention is not limited to any particular implementation technique. In accordance with one embodiment of the present invention, the function call that is examined to determine the source of an access request is the NSFDbOpen( ) function call, which is used to access the database for a particular user account. Thus, flags can be used with this function call to indicate whether the function call originates from the user or an agent or infrastructure component of the e-mail management software platform.

As should be appreciated from the described aspects of the present invention for use on a DOMINO e-mail platform, that features of the invention can be supported by hooking or interacting with various function calls employed by the DOMINO e-mail platform, examples of which include NSFDbOpen( ) which is executed to open a user account, and gain access to the appropriate database thereof; NSFNoteOpen( ) which is used to open a specific note (e.g., an e-mail); NSFDbReadObject( ) which is used to open an object of a note (e.g., an e-mail attachment); NSFNoteClose( ) which is used to close access to a note; and NSFDbClose( ) is used to close a user account.

Although the illustrative embodiments described above and in the following description relate to e-mails, these examples are not intended to be limiting, as the aspects of the present invention described herein can be used with other types of systems to manage other types of documents.

As should be appreciated from the foregoing, one embodiment of the invention is directed to a method and system for managing e-mails in a computer system that includes at least one e-mail server and at least one client computer. The e-mail server maintains a data set identifying e-mails that it manages, and implements a shortcut feature whereby at least a portion of at least one e-mail (e.g., an e-mail attachment or the entire e-mail) identified in the data set is identified in the data set by a shortcut identifier, and is stored remotely from the data set. Although shortcuts can be used on the e-mail server to conserve storage space, full copies of e-mails, including attachments, can be provided on a client computer. Accordingly, the client computer need not retrieve a full copy from the e-mail server, or other location, as the full e-mail is stored locally. For example, if the client computer is a portable computer, full e-mails (including attachments) can be available to a user of the client computer, even when the client computer is disconnected from the e-mail server.

E-mails replicated to a client computer can be assigned to an account of a user that logs into the e-mail system via the client computer. For example, the user can be one of one or more users assigned to a particular client computer.

Figure 2:
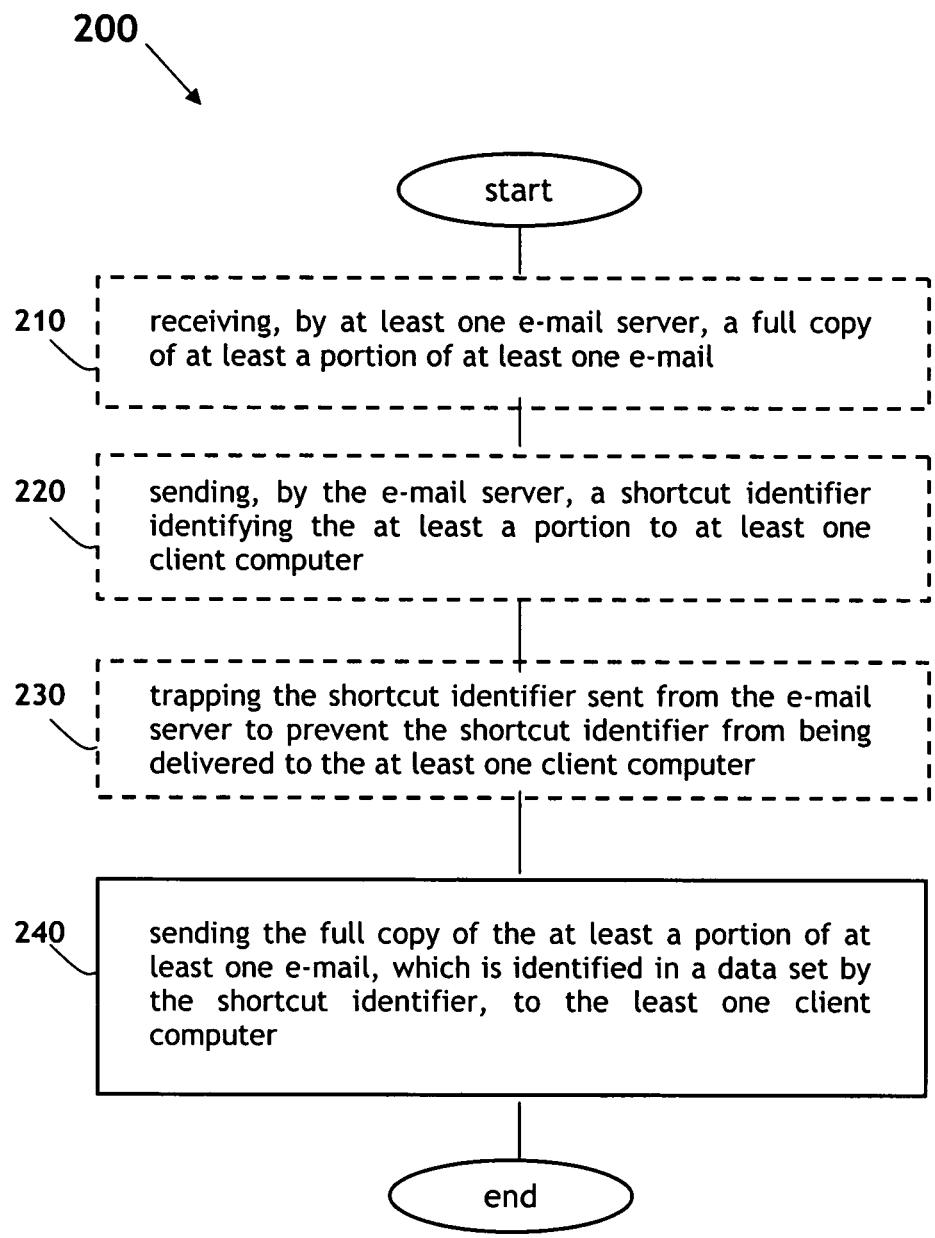
FIG. 2 is a flow diagram of a method for managing e-mails in a computer system that includes at least one e-mail server and at least one client computer, in accordance with one embodiment of the invention.

Referring now to FIG. 2, a method 200, which can be implemented on the system 100 (FIG. 1) or other suitable system, is illustrated that provides full copies of e-mails on a client computer. The method 200 includes receiving 210, by the e-mail server, a full copy of at least one portion of the at least one e-mail. A shortcut identifier for the e-mail, or a portion thereof, can then be created (e.g., by the e-mail software platform running on the e-mail server) of the e-mail, and the e-mail server can attempt to send 220 the shortcut identifier to the client computer Rather than permitting the shortcut identifier to be delivered to the client computer, software modifications running on the e-mail server can trap 230 the identifier sent from the e-mail server. A full copy of the e-mail can be sent 240 to the client computer rather than sending the shortcut identifier.

The act 240 of provide a full copy of the e-mail to the client computer can be implemented any suitable way. Act 240 can be automated so that, for example, full copies of e-mail can be stored on the client computer on a predetermined schedule, at the time the client computer is to be disconnected from the e-mail server, at the time a user first requests an e-mail, and/or at the time of first receipt of an e-mail by an e-mail server. Thus, as described below with reference to FIG. 3, a client computer can be disconnected from a network providing access to the server, and the locally available e-mail, including full copies of any shortcutted portions (e.g., attachment), can then remain accessible to a user of the client computer. In this manner, for example, full copies of e-mails associated with shortcut identifiers in a data set maintained by the e-mail server can placed on a client computer.

Figure 3:
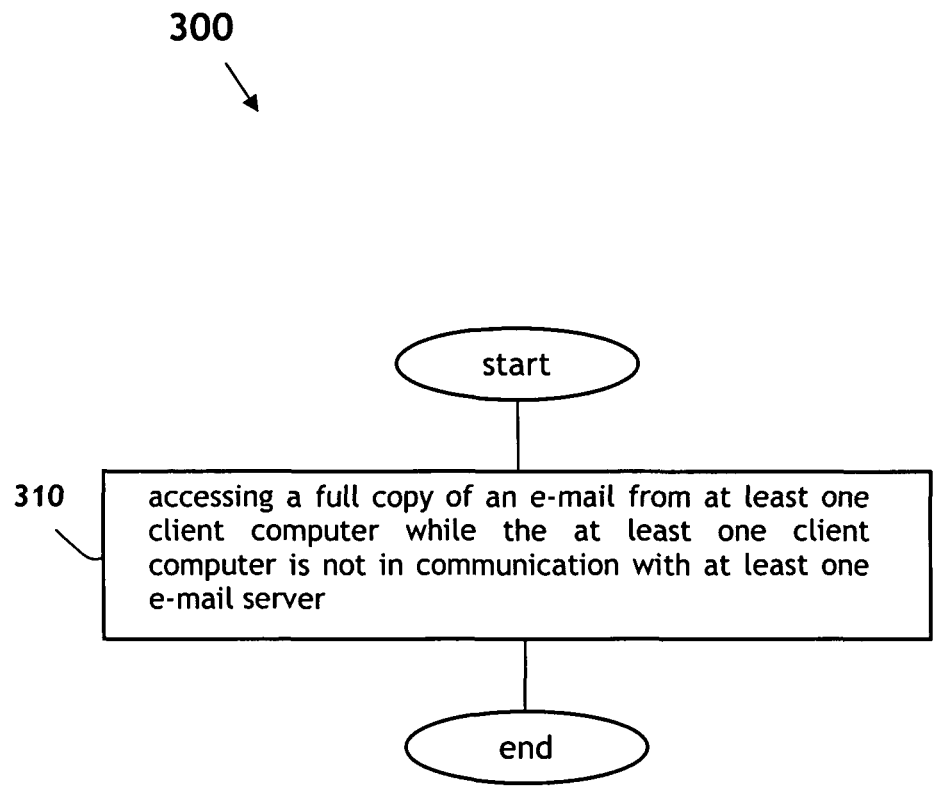
FIG. 3 is a flow diagram of a method for accessing e-mails in a computer system that includes at least one e-mail server and at least one client computer, in accordance with another embodiment of the invention.

Referring now to FIG. 3, a method 300, which can be implemented on the system 100 or any other suitable system, is illustrated that provides access to full copies of e-mails when a client computer is not attached to an e-mail server via a network. Similar to the e-mail server 110 in the system 100, the e-mail server maintains a data set identifying e-mails that it manages, and implements a shortcut feature whereby portions of e-mails are identified in the data set by shortcut identifiers. The method 300 includes accessing 310 a full copy of an e-mail from a client computer while the client computer is not in communication with an e-mail server.

Full copies of e-mails can be accessed locally from the client computer by, for example, providing the full copies, including full copies of attachments, on the client computer in any suitable manner. Full copies can be delivered to the client computer via the control of software running on the e-mail server and/or the client computer. For example, as described above with reference to FIG. 1, features of the software components on the e-mail server 110 described above can be used to maintain full copies of e-mail on the client computer.

For example, the method 300 can include trapping of an indicator of a shortcut identifier sent from an e-mail server before the shortcut identifier arrives at the client computer. Instead of delivering the indicator, a replicated copy is delivered to the client computer.

The method 300 can also include storing the replicated copy on the client computer when the client computer is coupled to the at least one e-mail server for later access. Storing can be automated so that a user need initiate the storing process. Moreover, storing can be performed in response to an e-mail application program executing on the client computer. The replicated copy stored by the at least one client computer can correspond to e-mails assigned to an account of a user that logs into the at least one client computer.

Figure 4:
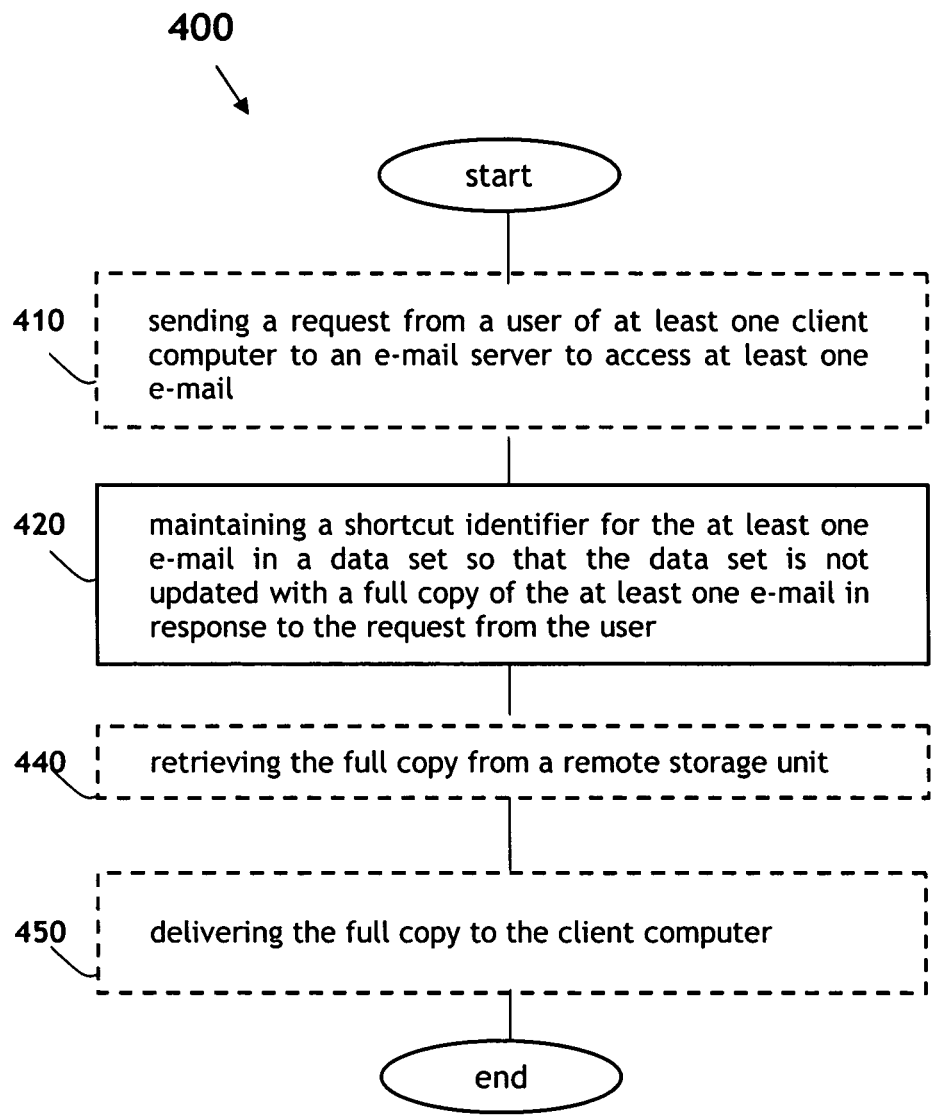
FIG. 4 is a flow diagram of a method for managing e-mails in a computer system that includes at least one e-mail server and at least one client computer, in accordance with another embodiment of the invention.

Referring now to FIG. 4, a method 400, which can be implemented on the system 100 or any other suitable system, is illustrated that prevents replication in a data set of a full copy of an e-mail when the full copy is directed to a client computer. The method 400 provides management of e-mails in a computer system that includes at least one e-mail server and at least one client computer, wherein, the e-mail server maintains a data set including shortcut identifiers.

The method 400 includes sending 410 an access request for an e-mail from a user of a client computer to an e-mail server, and maintaining 420 a shortcut identifier associated with the requested e-mail in the e-mail server data set in response to the access request. Accordingly, the data set is not updated with a full copy of the requested e-mail.

Maintaining 420 can entail, in response to the request, providing the full copy of the e-mail to the user on the client computer, without the e-mail server updating its data set with the full copy of the e-mail.

A full copy of the e-mail is retrieved 440 from an extension server, such as the extension server 120, rather than from the e-mail server, and an act of delivering 450 the full copy to the client computer. For example, in response to a trapped function call, the full copy can be retrieved from an extension server, and delivered to a client computer, without action by the e-mail server. As described above with reference to FIG. 1, a client computer can generate a function call in response to a user selecting an attachment. The function call can be intercepted to prevent the e-mail server from replicating the attachment and/or the entire associated e-mail.

As should be appreciated from the foregoing, there are numerous aspects of the approaches described above that can be used independently of one another. It should also be appreciated, however, that in some embodiments, all of the above-described features can be used together, or any combination or subset of the features described above can also be employed together in a particular implementation, as the aspects of the present approaches are not limited in this respect.

The above-described embodiments can be implemented in any of numerous ways. For example, some embodiments may be implemented using hardware, software or a combination thereof. When implemented in software, the software code can be executed on any suitable processor or collection of processors, whether provided in a single computer or distributed among multiple computers, which may be servers. It should be appreciated that any component or collection of components that perform the functions described above can be generically considered as one or more controllers that control the above-discussed function. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that some embodiments are directed to computer-readable media (e.g., a computer memory, one or more floppy disks, compact disks, optical disks, magnetic tapes, etc.) encoded with one or more programs that, when executed on one or more computers or other processors, perform methods that implement the various embodiments discussed above. A computer-readable medium or media can be transportable, such the program or programs stored thereon can be loaded onto one or more different computers or other processors to implement various aspects of the present approaches as discussed above.

It should be understood that the term "program" is used herein in a generic sense to refer to any type of computer code or set of instructions that can be employed to program a computer or other processor to implement various aspects of the present approaches as discussed above. Additionally, it should be appreciated that according to one aspect of this embodiment, one or more computer programs, when executed, perform methods that need not reside on a single computer or processor, but may be distributed in a modular fashion amongst a number of different computers or processors to implement various aspects of the present approaches. For example, programs that support features of the invention may be implemented, at least in part, on, the e-mail server 110 and/or the extension server 120.

Various aspects of the present approaches may be used alone, in combination, or in a variety of arrangements not specifically discussed in the embodiments described in the foregoing and is therefore not limited in its application to the details and arrangement of components set forth in the foregoing description or illustrated in the drawings. The approaches are capable of other embodiments and of being practiced or of being carried out in various ways. In particular, various aspects of the present approaches may be implemented in connection with any type of network, cluster or configuration. No limitations are placed on the network implementation. Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed is:

1. A method of managing e-mails in a computer system comprising at least one e-mail server, at least one other server and at least one client computer, wherein the e-mail server maintains a data set identifying a plurality of e-mails managed by the e-mail server, wherein at least some of the plurality of e-mails are individually identified in the data set by an associated shortcut identifier, and wherein the attachments are stored by the other server, the method comprising:

transmitting, by the client computer, requests to access at least some of the plurality of e-mails to the at least one e-mail server, wherein the requested e-mails are intercepted if the e-mails individually include having an attachment identified in the data set by the associated shortcut identifier;

receiving individually, at the client computer in response to the requests, full copies of the at least some of the plurality of e-mails having attachments thereof identified in the data set by the associated shortcut identifiers, the full copies of the at least some of the plurality of e-mails comprising all of the content of the e-mails, including the attachments stored in the other server such that the attachments replace the shortcut identifiers at the client computer in the full copies of the at least some of the plurality of e-mails; and storing, by the client computer, the full copies of the at least some of the plurality of e-mails, including the attachments that were received at the client computer in response to the request.

2. The method of claim 1, wherein the full copies of the at least some of the plurality of e-mails stored by the at least one client computer is are associated with an account of a user that logs into the at least one client computer.

3. The method of claim 1, wherein the transmitting, by the client computer, a the requests is not in response to a user of the client computer accessing the at least one e-mail.

4. The method of claim 1, wherein the full copies are received via the at least one e-mail server or the at least one other server.

5. The method of claim 1 wherein the at least partial copies of at least some of the plurality of e-mails received at the client computer do not comprise the shortcut identifiers.

6. A method of accessing at least one e-mail in a computer system comprising at least one e-mail server and at least one client computer, wherein the e-mail server maintains a data set identifying a plurality of e-mails managed by the e-mail server, wherein at least some of the plurality of e-mails are individually identified in the data set by an associated shortcut identifier, wherein full copies of the identified e-mails are stored remotely from the data set by at least one other server, wherein the e-mail server and the other server are separate servers, wherein the e-mail server is in communication with the other server over a network, the method comprising:

transmitting, by the client computer, requests to access at least some of the plurality of e-mails to the at least one e-mail server, wherein the requested e-mails are intercepted if the e-mails individually include having an attachment identified in the data set by the associated shortcut identifier;

receiving individually, at the client computer, the full copies of the requested e-mails via the other server, the full copies of the requested e-mails comprising all of the content of the e-mails, including the attachments identified in the data set by the shortcut identifiers such that the attachments replace the shortcut identifiers at the client computer in the full copies of the e-mails; and accessing the full copies of the requested e-mails, including the attachments that were received at the client computer in response to the requests, from the client computer while the client computer is not in communication with either the e-mail server or the other server.

7. The method of claim 6, wherein the full copies of the requested e-mails stored by the at least one client computer corresponds to e-mails assigned to an account of a user that logs into the at least one client computer.

8. The method of claim 6, further comprising storing the full copies of the requested e-mails on the at least one client computer when the at least one client computer is coupled to the at least one e-mail server and/or the at least one other server.

9. The method of claim 8, wherein storing the full copies of the requested e-mails is performed not in response to a user of the at least one client computer accessing the at least some of the plurality of e-mails, and wherein the full copies replace shortcut identifiers associated with the full copies.

10. The method of claim 6, wherein transmitting, by the client computer, requests to access the at least some of the plurality of e-mails are performed in response to an application program executing on the at least one client computer.

11. The method of claim 6, wherein the transmitting, by the client computer, a requests to access at least some of the plurality of e-mails is performed prior to the receiving, at the client computer, the full copies of the at least some of the plurality of e-mails, and wherein the at least one other server comprises at least one extension server supporting the at least one e-mail server.

12. A method of managing e-mails in a computer system comprising at least one e-mail server, at least one other server and at least one client computer, wherein the e-mail server and the other server are separate servers, wherein the e-mail server is in communication with the other server over a network, wherein the e-mail server maintains a data set identifying a plurality of e-mails managed by the e-mail server, wherein at least some of the plurality of e-mails are individually identified in the data set by an associated shortcut identifier, and wherein the attachments are stored by the other server, the method comprising:
   receiving, at the e-mail server, requests to access at least some of the plurality of e-mails having attachments individually identified in the data set by the associated shortcut identifier;
   sending in response to the requests, via the e-mail server, the attachments to the client computer; and
   maintaining, by the at least one e-mail server, the shortcut identifiers for the e-mails in the data set so that the data set is not updated to include the attachments.

13. The method of claim 12 comprising:
   after the receiving, at the e-mail server, a requests to access at least some of the plurality of e-mails having attachments identified in the data set by the shortcut identifiers, determining that the e-mail server is attempting to send the shortcut identifiers to the client computer; and
   upon the determination, preventing the shortcut identifiers from being sent with the at least some of the plurality of e-mails to the client computer.

14. The method of claim 12 wherein the sending in response to the requests, via the e-mail server, the attachments to the client computer comprises:
   sending, with the attachment to the client computer, the at least some of the plurality of e-mails to the client computer, wherein the at least some of the plurality of e-mails sent to the client computer does not comprise the shortcut identifiers.

15. The method of claim 12 wherein the receiving, at the e-mail server, the requests to access at least some of the plurality of e-mails having attachments identified in the data set by the shortcut identifiers comprises:
   determining whether the requests originated from a user of the at least one client computer or an agent software component of the e-mail server,
   wherein the sending, in response to the requests, the attachments to the client computer is based on a determination that the requests originated from the user of the at least one client computer, and
   wherein if a determination is that the requests originated from the agent software component of the e-mail server, not sending the attachments.

16. A method of managing e-mails in a computer system comprising at least one e-mail server, at least one other server and at least one client computer, wherein the e-mail server maintains a data set identifying a plurality of e-mails managed by the e-mail server, wherein at least some of the plurality of e-mails are individually identified in the data set by an associated shortcut identifier, and wherein the attachments are stored by the other server, the method comprising:
   receiving, by the client computer, at least partial copies of at least some of the plurality of e-mails identified in the data set, the at least some of the plurality of e-mails comprising the at least one e-mail, wherein the at least partial copies of the least some of the plurality of e-mails received by the client computer comprises the attachments that are identified in the data set by the shortcut identifiers, wherein the attachments are received automatically and not in response to a user of the client computer accessing the e-mails; and
   storing the partial copies by the client computer.

17. The method of claim 16, further comprising:
   receiving at the client computer the at least partial copies, wherein the at least partial copies are received on a predetermined schedule.

18. The method of claim 16, further comprising:
   receiving the at least partial copies by the client computer transmitted by the at least one e-mail server.

19. The method of claim 16, further comprising:
   receiving the at least partial copies by the client computer transmitted by the at least one other server.

20. The method of claim 16, wherein the receiving, by the client computer, at least partial copies is performed in response to execution of an application program on the at least one client computer.

21. The method of claim 16, wherein the at least one other server comprises at least one extension server that supports the at least one e-mail server.

22. The method of claim 21, wherein the at least one extension server provides the at least one e-mail to the client computer in accordance with a predetermined policy.

23. At least one non-transitory computer readable storage medium encoded with a plurality of instructions that, when executed, perform a method of managing e-mails in a computer system comprising at least one e-mail server, at least one other server and at least one client computer, wherein at least some of the plurality of e-mails are individually identified in the data set by an associated shortcut identifier, and wherein the attachments are stored by the other server, the method comprising:
   transmitting, by the client computer, requests to access at least some of the plurality of e-mails to the at least one e-mail server, wherein the requested e-mails are intercepted if the e-mails individually include having an attachment identified in the data set by the associated shortcut identifier;
   receiving individually, at the client computer in response to the requests, full copies of the at least some of the plurality of e-mails having attachments thereof identified in the data set by the associated shortcut identifiers, the full copies of the at least some of the plurality of e-mails comprising all of the content of the e-mails, including the attachments stored in the other server such that the attachments replace the shortcut identifiers at the client computer in the full copies of the at least some of the plurality of e-mails; and storing, by the client computer, the full copies of the at least some of the plurality of e-mails, including the attachments that were received at the client computer in response to the request.

24. At least one non-transitory computer readable storage medium encoded with a plurality of instructions that, when executed, perform a method of accessing at least one e-mail in a computer system comprising at least one e-mail server and at least one client computer, wherein the e-mail server maintains a data set identifying a plurality of e-mails managed by the e-mail server, wherein at least some of the plurality of e-mails are individually identified in the data set by an associated shortcut identifier, wherein a full copies of the identified e-mails are is stored remotely from the data set by at least one other server, wherein the e-mail server and the other server are separate servers, wherein the e-mail server is in communication with the other server over a network, the method comprising:

transmitting, by the client computer, requests to access at least some of the plurality of e-mails to the at least one e-mail server, wherein the requested e-mails are intercepted if the e-mails individually include having an attachment thereof identified in the data set by the associated shortcut identifier;

receiving individually, at the client computer, the full copies of the requested e-mails via the other server, the full copies of the requested e-mails comprising all of the content of the e-mails, including the attachments identified in the data set by the shortcut identifiers such that the attachments replace the shortcut identifiers at the client computer in the full copies of the e-mails; and accessing the full copies of the requested e-mails, including the attachments that were received at the client computer in response to the requests, from the client computer while the client computer is not in communication with either the e-mail server or the other server.

25. At least one non-transitory computer readable storage medium encoded with a plurality of instructions that, when executed, perform a method of managing e-mails in a computer system comprising at least one e-mail server, at least one other server and at least one client computer, wherein the e-mail server and the other server are separate servers, wherein the e-mail server is in communication with the other server over a network, wherein the e-mail server maintains a data set identifying a plurality of e-mails managed by the e-mail server, wherein at least some of the plurality of e-mails are individually identified in the data set by an associated shortcut identifier, and wherein the attachments are stored by the other server, the method comprising:

receiving, at the e-mail server, requests to access at least some of the plurality of e-mails having attachments individually identified in the data set by the associated shortcut identifier;

sending in response to the requests, via the e-mail server, the attachments to the client computer; and maintaining, by the at least one e-mail server, the shortcut identifiers for the e-mails in the data set so that the data set is not updated to include the attachments.

26. At least one non-transitory computer readable storage medium encoded with a plurality of instructions that, when executed, perform a method of managing e-mails in a computer system comprising at least one e-mail server, at least one other server and at least one client computer, wherein the e-mail server maintains a data set identifying a plurality of e-mails managed by the e-mail server, wherein at least some of the plurality of e-mails are individually identified in the data set by an associated shortcut identifier, and wherein the attachments are stored by the other server, the method comprising:

receiving, by the client computer, at least partial copies of at least some of the plurality of e-mails identified in the data set, wherein the at least partial copies of the least some of the plurality of e-mails received by the client computer comprise the attachments that are identified in the data set by the shortcut identifiers, wherein the attachments are received automatically and not in response to a user of the client computer accessing the e-mails; and storing the partial copies by the client computer.

* * * * *